US011958684B2

(12) United States Patent
Tassinari

(10) Patent No.: US 11,958,684 B2
(45) Date of Patent: Apr. 16, 2024

(54) BAMPER

(71) Applicant: Andrea Tassinari, Plymouth, MA (US)

(72) Inventor: Andrea Tassinari, Plymouth, MA (US)

(73) Assignee: Andrea Tassinari, Plymouth, MA (US)

( * ) Notice: Subject to any disclaimer, the term of this patent is extended or adjusted under 35 U.S.C. 154(b) by 109 days.

(21) Appl. No.: 16/690,473

(22) Filed: Feb. 10, 2020

(65) Prior Publication Data

US 2021/0245952 A1 Aug. 12, 2021

(51) Int. Cl.

*B65F 1/00* (2006.01)
*A47D 13/00* (2006.01)
*B65F 1/06* (2006.01)
*B65F 1/16* (2006.01)

(52) U.S. Cl.

CPC ............ *B65F 1/0046* (2013.01); *A47D 13/00* (2013.01); *B65F 1/06* (2013.01); *B65F 1/16* (2013.01); *B65F 2240/132* (2013.01)

(58) Field of Classification Search

CPC ...... B65F 1/0046; B65F 1/004; B65F 1/0073; B65F 1/08; B65F 1/16; B65F 1/061607; B65F 1/1623; B65F 2240/132; B65F 1/141; B65F 1/1415; B65F 1/1421; A47D 13/00; A47G 25/00; B65D 25/20; B65D 25/22

See application file for complete search history.

(56) References Cited

U.S. PATENT DOCUMENTS

D142,274 S * 8/1945 Kohen ........................... D32/37
3,218,090 A * 11/1965 Herman .................... B65F 1/06 280/47.26
3,647,078 A * 3/1972 Fortunato ............. A47F 5/0068 248/231.71
4,285,556 A * 8/1981 Loeffel .................. B25H 3/023 312/902
4,418,835 A * 12/1983 Watts ......................... B65F 1/06 220/495.1
4,535,911 A * 8/1985 Goulter ...................... B65F 1/06 220/495.1
4,867,328 A * 9/1989 McCarthy ............ B65F 1/0046 D34/1

(Continued)

FOREIGN PATENT DOCUMENTS

EP 3486198 A1 * 5/2019
WO WO-9521783 A1 * 8/1995 ............ B65F 1/0046
WO WO-2005030613 A1 * 4/2005 ............ B65F 1/1646

OTHER PUBLICATIONS https://www.amazon.com/Seville-Classics-Handwoven-Laundry-Original/dp/B07DDDYV5Z/ref=asc_df_B07DDDYV5Z/?tag=hyprod-20&linkCode=df0&hvadid=242146558294&hvpos=&hvnetw=g&hvrand=14654185125373578601&hvpone=&hvptwo=&hvqmt=&hvdev=c&hvdvcmdl=&hvlocint=&hvlocphy=9061285&hvtargid=pla-465835267904&th=1 (Year: 2013).*

(Continued)

*Primary Examiner* — J. Gregory Pickett
*Assistant Examiner* — Abigail Elizabeth Guidry

(57) ABSTRACT

Disclosed is a baby hamper with divider system that provides a convenient storing of soiled diapers and soiled clothes for a convenient storing of multiple items together in the same unit. The baby hamper with divider system comprises: a hamper; a liner or insert; two separate closing covers with a Velcro attachment for the hamper; a securing means including hooks for hamper; a fastening means including clips or tabs for interior of the insert, a holding means including a spring for hamper, and a seal gasket cover to mask odor.

3 Claims, 5 Drawing Sheets

(56) References Cited

U.S. PATENT DOCUMENTS

| | | | | | |
|---|---|---|---|---|---|
| 4,905,853 | A * | 3/1990 | Strawder | B65F 1/06 220/23.83 |
| 4,907,707 | A * | 3/1990 | Crum | A47F 5/0093 206/556 |
| 4,923,087 | A * | 5/1990 | Burrows | B65F 1/06 220/495.1 |
| 5,050,768 | A * | 9/1991 | Alden | B65F 1/0046 220/551 |
| 5,072,852 | A * | 12/1991 | Smith | B30B 9/321 220/495.09 |
| 5,090,587 | A * | 2/1992 | Brown | B65F 1/141 211/85.19 |
| 5,480,113 | A * | 1/1996 | Hachenberg | B65B 67/12 248/100 |
| 5,485,928 | A * | 1/1996 | Felton | A47F 7/145 312/61 |
| 5,678,880 | A * | 10/1997 | Keller | B60J 3/0208 296/97.11 |
| 5,690,217 | A * | 11/1997 | Friday | D06F 95/002 220/532 |
| 5,699,564 | A * | 12/1997 | Heh | A47D 15/00 220/495.1 |
| 5,730,047 | A * | 3/1998 | Lindsey | B30B 9/3053 100/100 |
| 5,803,299 | A * | 9/1998 | Sealy, Jr. | B65F 1/062 220/495.07 |
| 5,873,643 | A * | 2/1999 | Burgess, Jr. | A47B 96/04 312/290 |
| 5,915,584 | A * | 6/1999 | Sposit | B65B 67/1227 220/495.09 |
| 6,123,215 | A * | 9/2000 | Windle | B65F 1/06 220/495.07 |
| 6,152,311 | A * | 11/2000 | German | G06F 1/181 211/175 |
| 6,354,433 | B1 * | 3/2002 | Mattes | A45D 27/28 206/228 |
| 6,530,495 | B1 * | 3/2003 | Joseph | B65F 1/004 220/669 |
| 7,229,143 | B2 * | 6/2007 | Gilman | F25D 23/04 312/405.1 |
| 7,377,411 | B1 * | 5/2008 | Stewart | B60R 7/043 224/585 |
| 7,451,881 | B2 * | 11/2008 | Hardy | A47F 5/0018 211/175 |
| 7,621,409 | B2 * | 11/2009 | Hardy | A47F 3/002 211/59.3 |
| 8,113,601 | B2 * | 2/2012 | Hardy | A47F 3/002 312/138.1 |
| 8,156,863 | B1 * | 4/2012 | Wilson | B30B 9/3042 100/226 |
| 9,070,261 | B2 * | 6/2015 | Hardy | A47F 3/002 |
| 9,345,352 | B2 * | 5/2016 | Shendelman | A47G 21/001 |
| 9,586,755 | B1 * | 3/2017 | Yang | B65F 1/1638 |
| 10,342,397 | B1 * | 7/2019 | Rosenberg | B65D 83/0805 |
| D889,759 | S * | 7/2020 | Tassinari | D32/37 |
| 10,849,446 | B2 * | 12/2020 | Shendelman | A47G 19/065 |
| D936,929 | S * | 11/2021 | Joseph | D34/11 |
| 2002/0027140 | A1 * | 3/2002 | George | B65F 1/163 220/495.06 |
| 2006/0157358 | A1 * | 7/2006 | Heidel | D06F 95/002 206/278 |
| 2006/0186187 | A1 * | 8/2006 | Laher | B65F 1/1607 232/1 B |
| 2006/0284030 | A1 * | 12/2006 | Ben-Simhon | B65D 33/001 248/97 |
| 2010/0237074 | A1 * | 9/2010 | Yang | B65F 1/06 220/262 |
| 2011/0074316 | A1 * | 3/2011 | Shek | B65F 1/1607 318/3 |
| 2011/0245057 | A1 * | 10/2011 | Scoledes | B65F 1/0006 493/227 |
| 2011/0290803 | A1 * | 12/2011 | Kehres | E04G 21/005 220/759 |
| 2012/0189230 | A1 * | 7/2012 | King | F16B 2/245 383/33 |
| 2014/0125049 | A1 * | 5/2014 | Decarlo | B42C 7/001 283/37 |
| 2017/0313503 | A1 * | 11/2017 | Busch | B65F 1/1468 |
| 2020/0102119 | A1 * | 4/2020 | Cyzen | B25H 3/00 |
| 2020/0354145 | A1 * | 11/2020 | McKee | B65F 1/1607 |
| 2021/0016963 | A1 * | 1/2021 | Lin | B65F 1/06 |

OTHER PUBLICATIONS

Seville Classic Store, Seville Classics Handwoven Oval Double Lidded Removable Canvas Liner Laundry Sorter Hamper Bin, Mocha Brown, 2013, Website Above (Year: 2013).*

"Nursery Style Diaper Pail." Nordstrom.com, Nordstrom, May 14, 2019, https://www.nordstrom.com/s/skip-hop-nursery-style-diaper-pail/5808120. (Year: 2019).*

* cited by examiner

BAMPER

TECHNICAL FIELD

The present invention relates to the field of storage containers utilized to temporarily store clothing and other materials while waiting to be cleaned. More particularly, the invention pertains to clothes hampers and a diaper organizer bag that provides compartments that are easily accessed, particularly having separating panels which allow the compartments to be sized appropriately.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the disclosure described herein. Accordingly, it should be understood that these statements are to be read in this light, and not as admissions of prior art.

Most people accumulate dirty clothes and other clothing-like materials so that they can wash the clothes as a group. The accumulation of dirty clothes allows a person to more efficiently utilize the time spent collecting, sorting and washing the clothing and more effectively and efficiently utilize the soap, water and electric or gas appliances utilized to wash the clothes.

Further it is necessary in the course of a given day for a user who is a parent or baby sitter to frequently change the diaper of an infant or small child. During this operation, the soiled diaper must be removed and disposed of, the child must be cleaned, certain skin care products such as lotions and powders may have to be used, all while being in close contact with the child so as to insure the child's safety. With the advent of disposable diapers, this operation usually includes having to remove diapers from large cardboard boxes on the floor which is both cumbersome and inconvenient. The inconvenience and other problems are only compounded when parents have several children to tend. The problem is furthermore compounded when the caregiver is mobile with the kid and he needs to actually store the soiled diapers until a suitable time when they can be disposed. A single unit to be used in a nursery or other similar area that could dispense one or more sizes of disposable diapers, provide a sanitary and odor-free disposal unit and be conveniently located to the changing area would be a great help to parents and others who must frequently change the diapers of infants and small children.

Prior art possesses, heretofore available clothes hamper comprising a single contiguous storage chamber in which all the dirty clothing is placed and mixed. Similar hampers are used for storing soiled/clean and unused diapers, creating a cumbersome effort of storage of soiled diapers with unsoiled ones. Needless to say, this can be a somewhat bothersome and inefficient.

The invention targets an easy to store and carry soiled diapers and soiled clothing and is concerned with both ease of change and the hygiene of the child, along with convenience of the caregiver.

There have been many prior art proposals for known prior art related to hamper design, focused on simplifying the process of storing the soiled diapers and/or clothes in a single unit. This invention addresses the storage problems by employing a simple dividing means which fully encompasses the removable liner with the hamper provided with cover and securing means, holding means for cover and divider. It simplifies the design of a hamper by the use of a divider using a simple attaching means.

Prior art which discloses the holding and transportation containers or hampers that have divider system to separate the single unit into compartments. The prior arts includes U.S. Pat. No. 8,727,172 B2, U.S. Pat. Nos. 5,961,216 A, 5,111,958 A, 5,690,217 A and US 2007 0200471 A1.

U.S. Pat. No. 8,727,172 B2 discloses a container comprising a receptacle defining a space where the receptacle comprises a wall having a draft. A divider is mounted to the receptacle such that the divider rotates between a first position and a second position such that when the divider is in the first position the space defines a single space and when the divider is in the second position the divider defines two spaces.

U.S. Pat. No. 5,961,216 A discloses a diaper organizer bag that provides a number of compartments that are easily accessed, particularly having separating panels which allow the compartments to be sized appropriately, and also having a drawer system that allows a parent to store a large number of small items in a organized manner.

U.S. Pat. No. 5,111,958 A, discusses a refuse collection unit for household use comprising a container body defining a first storage area adapted to receive at least a conventional plastic refuse bag therein and a second storage area adapted to receive at least two removable rigid liners in a side-by-side disposition therein. The removable liners are each used to store a particular type of recyclable refuse material therein, and the conventional plastic refuse bag for storage of nonrecyclable refuse. The liners include a bottom wall, three liner walls and an upwardly stepped fourth wall. Hand-gripping elements are provided on each of said liners. The first storage area rises higher than the second storage area for easy recognition of the areas. In addition, a pair of hinged cover members are provided, one for the first storage area and the other for the second storage area. A third liner may be placed in the first storage area to occupy substantially one-half of said first storage area.

U.S. Pat. No. 5,690,217 A discusses a movable laundry storage unit is provided which generally comprised of a rigid body member having a closed bottom and an open top end and defining a clothing and article storage area. A pair of wheel members are preferably attached to the bottom of the body member and handle member is attached to the back portion of the body member. The storage unit can be provided with one or more dividers for sectioning the storage area into two or more compartments. A cover member is also provided to prevent any stored clothing or articles from falling out of the storage area while the storage unit is in transit.

US 2007 0200471 A1 discloses a clothes hamper cabinet is configured as a fine piece of furniture to disguise its use to collect and store dirty clothes. The cabinet has a main body defining a storage chamber therein with a top opening at the upper section of the main body for receiving dirty clothes into the storage chamber and a front opening on the front wall for removing dirty clothes therefrom. A door substantially closes the front opening. Preferably, the cabinet is supplied with a top member or lid that substantially closes the top opening. A divider is provided to divide the storage chamber into subchambers to facilitate selective sorting of the clothes when being deposited in the cabinet. The back wall, bottom wall and divider can be provided with vent holes to facilitate air circulation through the storage chamber. One or more removable baskets can be utilized for ease of removing dirty clothes.

As discussed above, there is a need in the art for a hamper with a divider system with washable liners to divide the single hamper into compartments provided with cover seal to prevent bad odor from soiled diapers section to reach clean diaper section.

What is needed is a system or method that solves one or more of the problems described herein and/or one or more problems that may come to the attention of one skilled in the art upon becoming familiar with this specification. To address these problems, the current has been designed.

SUMMARY

In view of the foregoing disadvantages inherent in the known types of hampers present in the prior art, the present invention provides an improved baby hamper with divider system that provides a convenient storing of soiled diapers and soiled clothes. As such, the general purpose of the present invention, which will be described subsequently in greater detail, is to provide a new and improved baby hamper with divider system which has all the advantages of the prior art and none of the disadvantages.

One or more aspects of the present disclosure described herein overcome the above shortfalls of prior attempted methods, devices, and systems. In particular, in one aspect of the present disclosure described herein, the improved baby hamper with divider system that provides a convenient storing of soiled diapers along with soiled clothing in the same unit.

This invention was created with simplicity in mind. It is being created to be the simplest and most efficient universal baby hamper with divider system that provides for a convenient storing of multiple items together in a single unit. All attributes discussed could be necessary to the function of this invention.

In another aspect of the present disclosure described herein, the baby hamper with divider system comprises: a hamper; a washable liner/insert; plastic interior frame with two squared cut outs; 2 separate closing lids for each side; a gasket seal to secure odor from diapers; plastic seal on secondary lid; independently bent steel frame hooks; a steel clamp springs mechanism in each hook; a independent hook on back for secondary hanging; a hooking system on all four corners of interior frame for securing bags.

In still another aspect of the present disclosure described herein, the baby hamper with divider system comprises of a removable and washable liner for compartmentalizing the hamper into sections.

In still another aspect of the present disclosure described herein, the baby hamper with divider system with the insert made of Polyethylene Vinyl Acetate (PEVA).

In still another aspect of the present disclosure described herein, the baby hamper with divider system hangs and does not occupy floor space adding to the convenience and saving space.

In still another aspect of the present disclosure described herein, the baby hamper with divider system to solve the problem of caregivers (moms, dads, babysitters) of storing dirty items in a unit near where the baby is changed and eliminates the need for constant trips to the trash and laundry.

A still further object is to provide a baby hamper with divider system that will be inexpensive to produce, of simple construction, and fully practical in its operation.

It is still another aspect of the present invention to provide a baby hamper with divider system which may be easily and efficiently manufactured and marketed.

Each aspect of the present invention provides the advantage of customising the baby hamper with divider system applicable for different sized hampers.

Each aspect of the present invention provides the advantage of the baby hamper with divider system easy to detach for cleaning or washing.

This invention may come in an array of similarly fashioned shapes, colors, and sizes to accommodate retailer preferences and specifications.

With the above and other objects in view which will appear as the description proceeds, the invention resides in combination and arrangement of parts and in the details of construction hereinafter described and claimed, it being understood that, within the scope of what is claimed, changes in the precise embodiment of the invention shown can be made without departing from the spirit of the invention.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DETAILED DESCRIPTION OF THE INVENTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The following embodiments, which are incorporated into and form part of this disclosure, illustrate embodiments of the invention and together with the description, serve to explain the principles of the invention. To the accomplishment of the foregoing and related ends, certain illustrative aspects of the invention are described herein in connection with the following description. These aspects are indicative, however, of but a few of the various ways in which the principles of the invention can be employed and the subject invention is intended to include all such aspects and their equivalents.

Referring to the invention now in more detail, the invention is directed to a baby hamper with divider system that provides a convenient storing of soiled diapers and soiled clothes and/or unsoiled diapers along with other regular products and for a convenient storing of multiple items together in the same unit. The baby hamper with divider system comprises: a hamper; a washable liner/insert; plastic interior frame with two squared cut outs; 2 separate closing lids for each side; a gasket seal to secure odor from diapers; plastic seal on secondary lid; independently bent steel frame hooks; a steel clamp springs mechanism in each hook; a independent hook on back for secondary hanging; a hooking system on all four corners of interior frame for securing bags.

This section summarizes some aspects of the present disclosure and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present disclosure nor imply any limitations.

Figure 1:
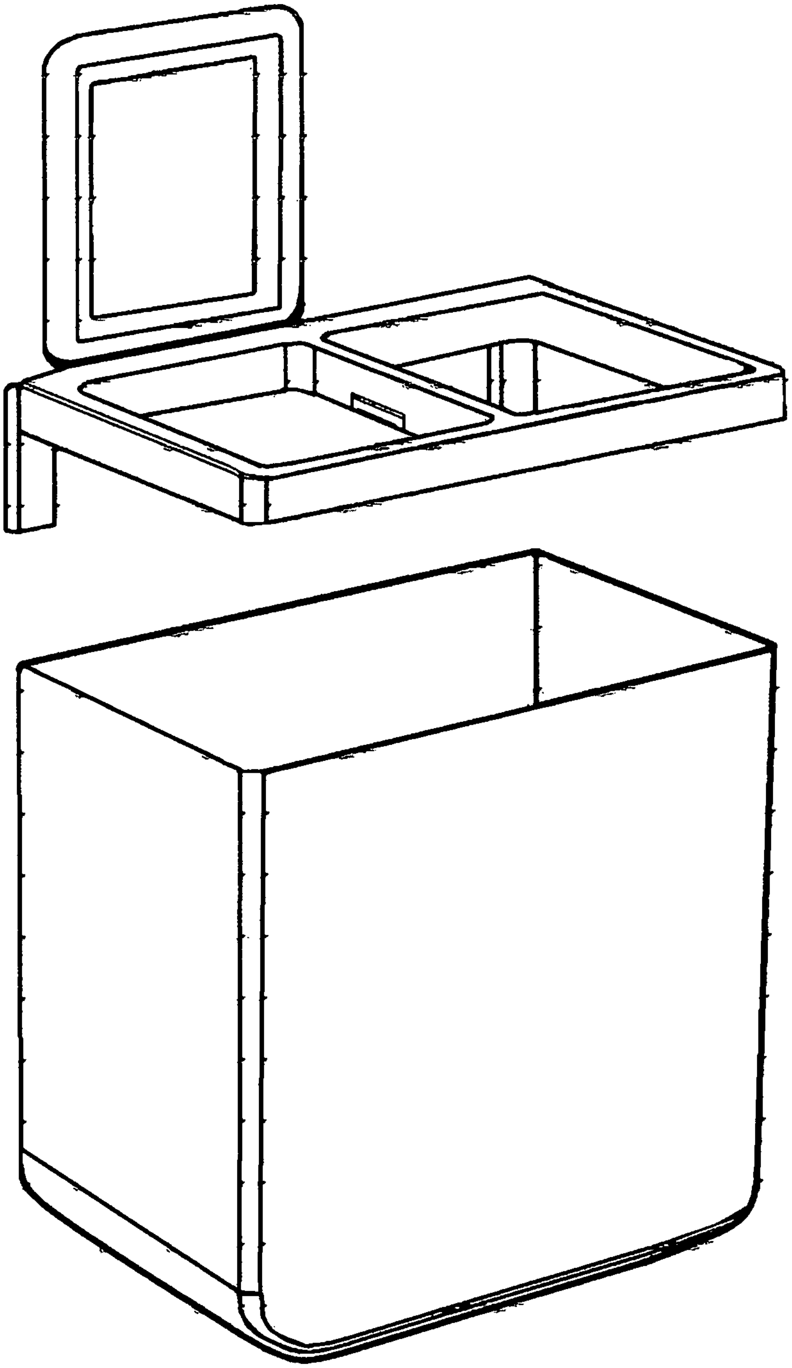
FIG. 1 illustrated is a front view of the hamper with divider system according to a preferred embodiment of the current invention.

Referring now to the drawing (FIG. 1), wherein it is depicted that the structure of the exterior is 1 unit and it is completely closed at both top compartments. (1) highlights the outer shell component of the invention as it is the entire exterior. (2) highlights the top covers of the invention when the two separate compartments are closed on both sides at the same time.

Figure 2:
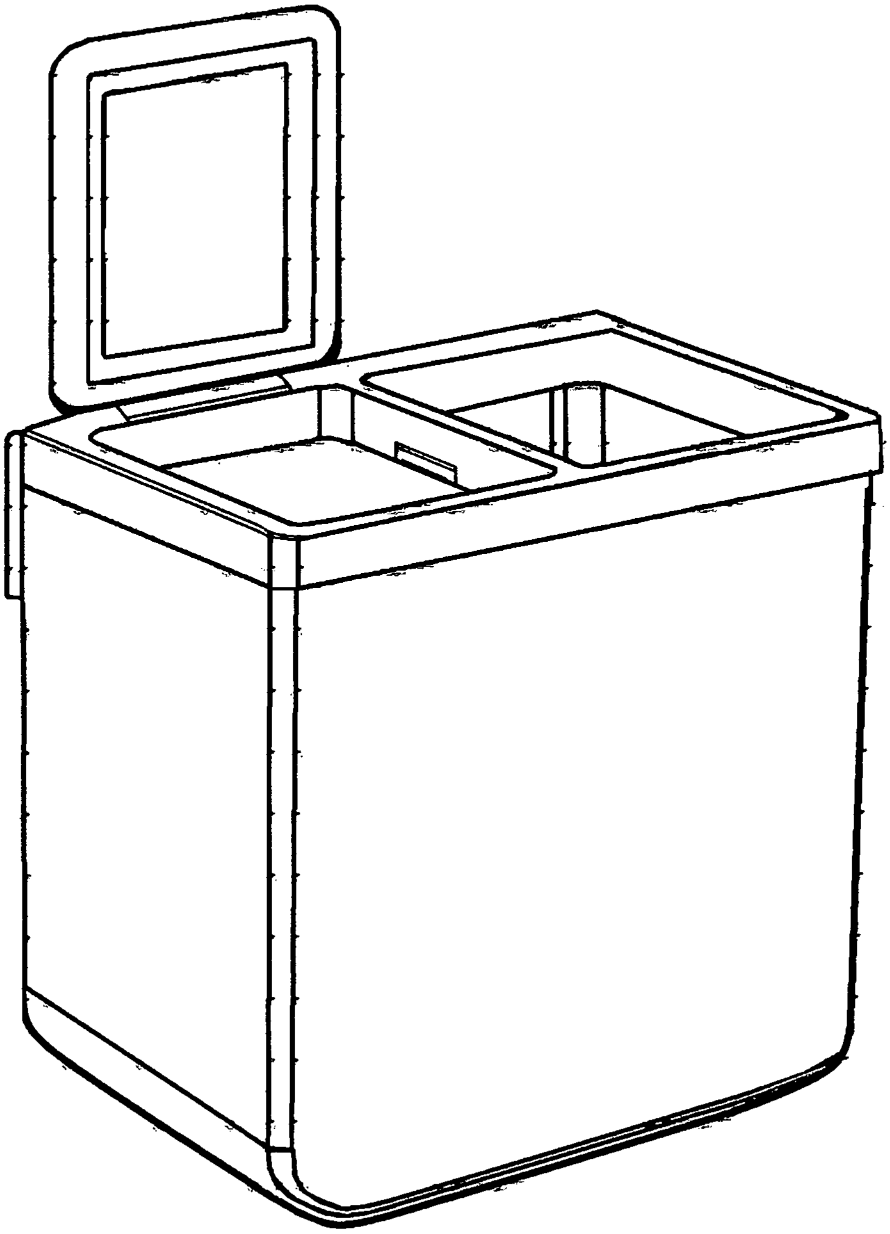
FIG. 2 illustrated is a ariel view of the hamper with the seal gasket lid attached to the plastic interior frame preferred embodiment.

Referring now to the drawing (FIG. 2), wherein (1) the hard shell plastic interior frame is separate from the bottom portion of the unit. (2) The seal gasket is in the open position to emphasize how the structure is put together as well as the odor protection portion of the invention. (3) highlights the outer shell of the invention as it is separate from the plastic interior frame to as they are two different components of the invention. (4) highlights the separation of the chambers of the interior portion of the invention. (5) highlights the separate/independent hooking system for the invention located on the back part of the invention for a secondary hanging option.

Figure 3:
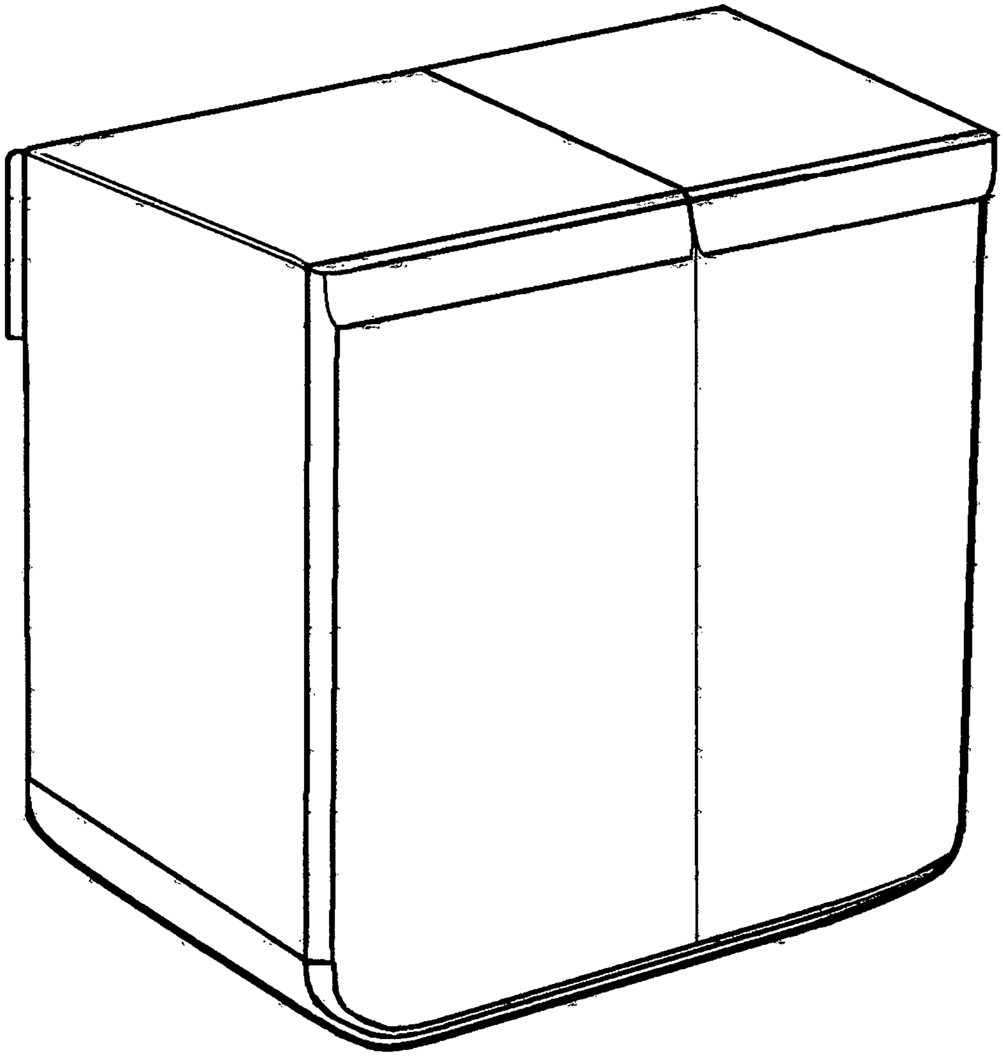
FIG. 3 illustrated is a frontal top view of the hamper with divider system with the seal gasket side open to a preferred embodiment of the current invention.

Referring now to the drawing (FIG. 3), wherein the frontal top of the unit of the structure which is the (1) seal gasket is in the open position to a preferred embodiment of the unit.

Referring now to the drawings (FIG. 4), wherein like reference characters designate identical, or corresponding parts throughout the figures, (and in addition to FIGS. 1,2 & 3) show various embodiments of the hamper with divider system in accordance with the present invention.

Figure 4:
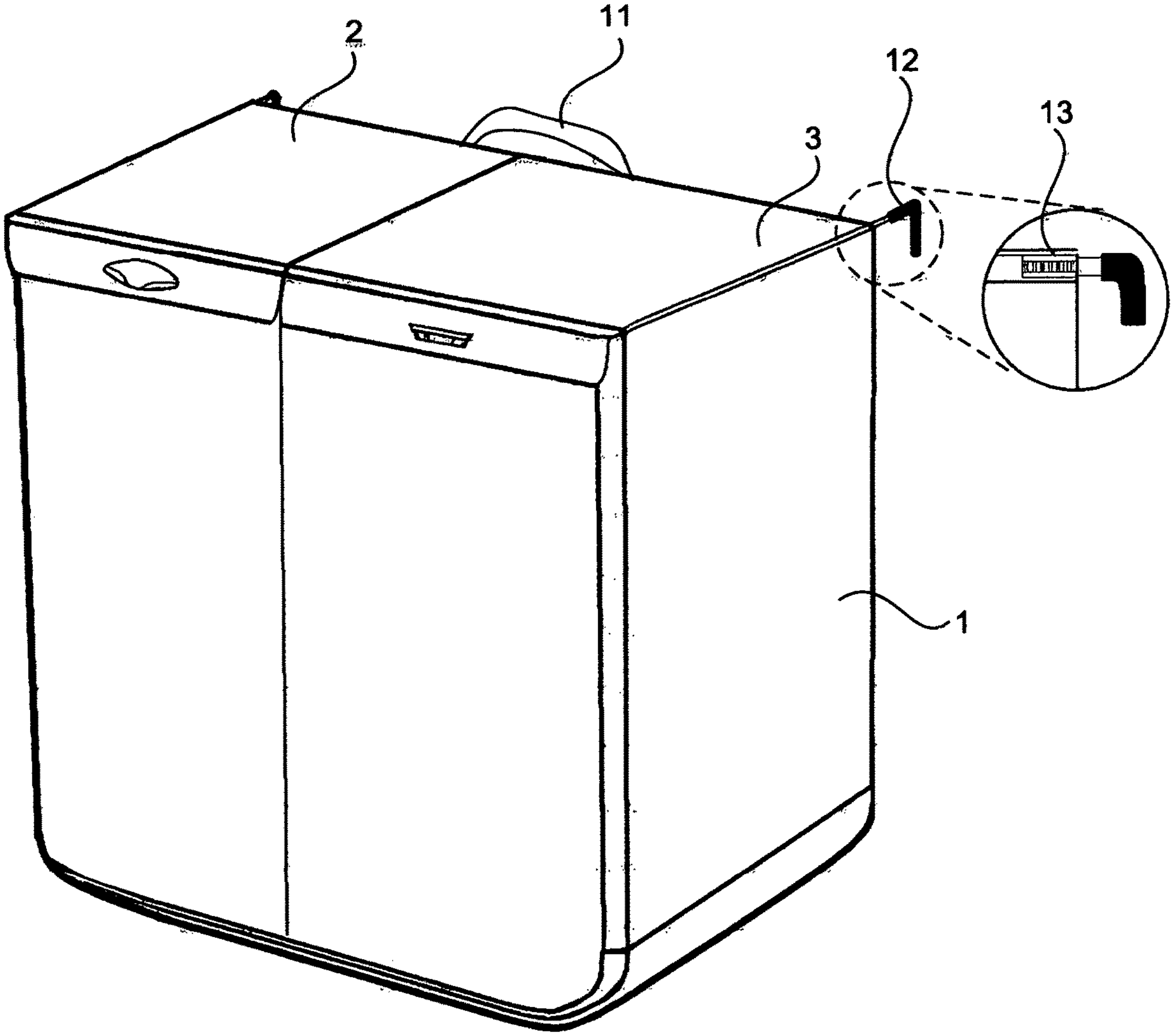
FIG. 4 is a front perspective view of the apparatus disclosed herein in a closed configuration.
Figure 5:
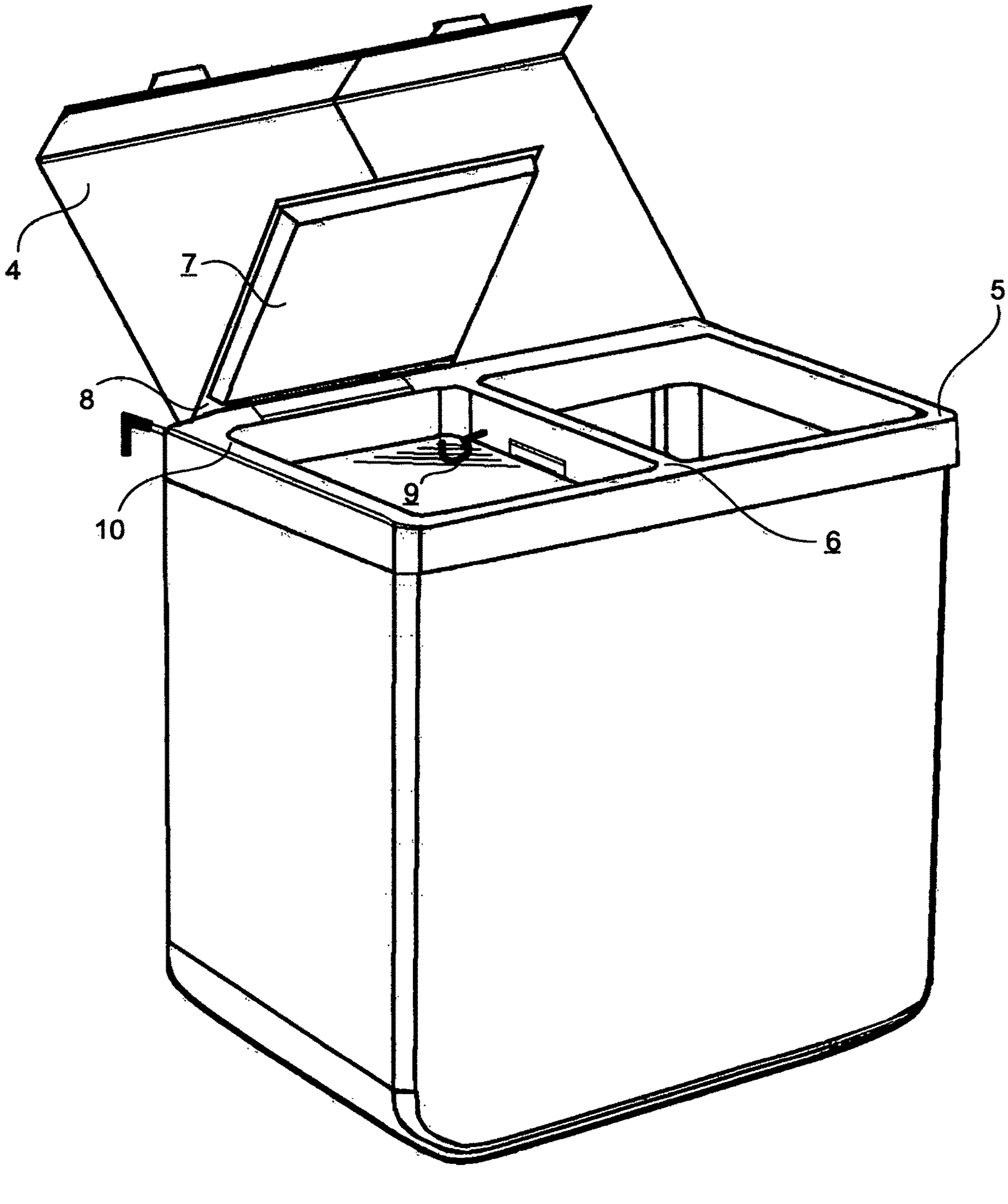
FIG. 5 is a front perspective view of the apparatus disclosed herein in an open configuration.

FIG. 4 illustrates a front view of the (1) hamper with divider system including outer structure of the hamper with a washable fabric, (2) the left side is dedicated to discarded soiled diapers (3) and the right side is dedicated to discarded soiled clothing. (4) Each side has independent opening flaps. (5) The structure has a plastic interior frame with two cut outs. (6) There are four hooks on the frame at each corner to aid in holding a plastic bag in that side. (7) On the left (the soiled diaper side) there is a secondary lid with a seal gasket. (8) The seal gasket lid is attached to the plastic interior frame in the back portion of said frame. (9) There are four hooks at each of the corners of the interior frame. (10) The secondary lid has a plastic seal as well. (11) There is a strap on the back of the structure for additional hanging options. (12) The structure has two independent bent steel frame hooks located on the back upper right and upper left. (13) The hooks are attached to steel clamp springs to ensure the structure can be naturally tightened/hooked onto various surfaces.

The present invention generally provides the hamper with divider system including but not limited to the hamper herein referred to as BAMPER.

In a preferred embodiment of the invention the baby hamper with divider system comprises of a removable and washable insert or liner for compartmentalizing the hamper into sections. The hamper has a washable liner for easy removing and cleaning. The cover 04 helps provide a clean look, shuts the appearance of dirty items, and helps keep the odor of soiled diapers and dirty items to a minimum. The plastic interior divider gives the user a clear direction of where to place dirty clothes and dirty diapers therefore making the BAMPER a storage unit for both items at the same time. The individual covers splits so the user can keep one side closed while utilizing the other side (so they will not have to put their hand into the unit with dirty diapers).

In another preferred embodiment of the invention the baby hamper with divider system comprises the outer structure of the hamper 01 is made of washable fabric material (included on the covers or each side of the BAMPER). The interior frame with two separate cut outs (5) is made of a plastic material preferably of 0.25" thickness. The dimensions of the unit is 12".times.12".times.12" deep. The insert 08 will fit in 0.25" ‘tabs’ 07 on the front and back of the interior of hamper: 1 set at the top, 1 set in the middle, 1 set on the bottom (for insert to slide into place). The ‘clips’ or ‘hooks’ (06) are small enough so when a bag is placed in the unit they are not in the way and they do not take up space for the soiled items in the unit. Further the ‘hooks’ (06) are part of the plastic shell of unit. The secondary lid (with seal gasket) 08 is made of PEVA at the interior and is custom built inside unit above the ‘hooks’ 06.

In preferred embodiment of the invention the BAMPER also features:

- lined interior that is washable (most preferred is PEVA liner)
- two separate units to hold more than 1 soiled item
- hooks onto pack-n-play unit (as well as other surfaces) so it doesn’t take up space on the floor
- cover shut individually
- interior cover splits so only one side can be emptied at a time if desired and skin of the caregiver doesn’t come in contact with soiled items In yet another embodiment, the liner 01 is a fixed part of the interior of the BAMPER. The interior frame will be the same plastic material as the seal gasket lid (07). The covers 04 will have a velcro attachment to seal while they are closed.

In yet another preferred embodiment of the invention the interior plastic frame 05 is divided directly in the middle.

The hamper is provided with the closing means: cover on the top and Velcro attachment, hooks on the back. This ensure that a hygienic and tidy look is maintained even when Bamper is holding soiled diapers and clothes.

Securing means for hanging the entire bamper on to the pack'n'play type of other systems thereby saving the floor space. The securing means is at least the two hook fasteners on the back and a strap as well.

Fastening means to ensure that the bags are held in place by the clips that are located at the top of the interior frame of the hamper.

Holding means used is steel clamp springs for the hooks in back to hold the hamper on different surfaces.

The advantages of the system of the invention is that it provides an option of compartmentalizing the hamper to store soiled clothes from soiled diapers. Further the invention provides a dividing system that is easily detachable for washing or cleaning and comfortable for use.

Having thus described the several embodiments of the disclosure described herein, those of skill in the art will readily appreciate that other embodiments may be made and used which fall within the scope of the claims attached hereto. Numerous advantages of the disclosure described herein covered by this document have been set forth in the foregoing description. It will be understood that this disclosure is, in many respects, only illustrative. Changes can be made with respect to various elements described herein without exceeding the scope of the disclosure described herein. Although the present disclosure described herein has been described in considerable detail with reference to certain preferred versions or embodiments thereof, other versions and embodiments are possible.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A baby hamper comprising:

an outer structure of a washable fabric;

two compartments;

an interior dividing system wherein the interior dividing system is a hard plastic interior frame providing said two compartments;

an outwardly opening, hinged seal gasket lid attached to the interior frame in a back portion of said frame;

washable liners provided within the interior dividing system for easy removing and cleaning;

separate covers for each compartment, wherein at least one cover overlies the seal gasket lid;

hooking system wherein the hooking system comprises steel frame hooks attached to steel clamp springs secured on the back portion of the baby hamper; and fastening interior hooks wherein fastening hooks are present on each corner of the interior dividing system.

2. The baby hamper as claimed in claim 1, wherein the separate covers are provided for each compartment so that one side of the compartment may be secured while the other compartment may be in use.

3. The baby hamper as claimed in claim 1, further comprising a strap on the back portion of the baby hamper for additional hanging options.

* * * * *